United States Patent
Doornheim

(10) Patent No.: US 12,172,362 B2
(45) Date of Patent: Dec. 24, 2024

(54) THERMOFORMING OF PLA-BASED ARTICLES

(71) Applicant: PURAC BIOCHEM B.V., Gorinchem (NL)

(72) Inventor: Martin Doornheim, Gorinchem (NL)

(73) Assignee: PURAC BIOCHEM, B.V., Gorinchem (NL)

(*) Notice: Subject to any disclaimer, the term of this patent is extended or adjusted under 35 U.S.C. 154(b) by 118 days.

(21) Appl. No.: 17/414,883

(22) PCT Filed: Jan. 8, 2020

(86) PCT No.: PCT/EP2020/050324
§ 371 (c)(1),
(2) Date: Jun. 16, 2021

(87) PCT Pub. No.: WO2020/144235
PCT Pub. Date: Jul. 16, 2020

(65) Prior Publication Data
US 2022/0143898 A1    May 12, 2022

(30) Foreign Application Priority Data
Jan. 9, 2019  (EP) ..................... 19150908

(51) Int. Cl.
B29C 51/42 (2006.01)
B29C 51/00 (2006.01)
(Continued)

(52) U.S. Cl.
CPC ............ B29C 51/002 (2013.01); B29C 51/08 (2013.01); B29C 51/421 (2013.01);
(Continued)

(58) Field of Classification Search
CPC ....... B29C 51/46; B29C 51/421; B29C 51/08; B29C 51/264
See application file for complete search history.

(56) References Cited

U.S. PATENT DOCUMENTS 5,180,765 A * 1/1993 Sinclair .................. C08K 5/101
524/320
5,443,780 A * 8/1995 Matsumoto ........... B29C 55/005
264/288.4
(Continued)

FOREIGN PATENT DOCUMENTS

CN       102260395 A   11/2011
EP       1463619 A1    10/2004
(Continued)

OTHER PUBLICATIONS

Lv, Tongxin, et al., New insight into the mechanism of enhanced crystallization of PLA in PLLA/PDLA mixture, Journal of Applied Polymer Science (2018), 7 pages. (Year: 2018).*
(Continued)

*Primary Examiner* — Matthew J Daniels
(74) *Attorney, Agent, or Firm* — Sunit Talapatra; Foley & Lardner LLP

(57) ABSTRACT

A method for producing a polylactic acid (PLA) shaped article by thermoforming and thermoformed PLA articles. The method for producing a shaped article includes: heating a sheet of crystallizable polylactic acid (PLA)-based resin having a ratio of cold crystallization over total melting enthalpy (ΔHcc/ΔHm) greater than 0.70 as determined by differential scanning calorimetry (DSC), wherein heating includes a heating step the sheet is heated from a surface temperature of at most 80° C. to a surface temperature of at least 90° C. to at most 150° C. at heating rate of 5° C. to 25° C. per second, to provide heated sheet having a ratio of cold crystallization over total melting enthalpy (ΔHcc/ΔHm)
(Continued)

greater than 0.5 as determined by DSC; and immediately after heating, forming heated sheet to provide a shaped article by means of a mold having a temperature of at least 70° C. and at most 120° C.

20 Claims, 1 Drawing Sheet

(51) Int. Cl.
  *B29C 51/08* (2006.01)
  *B29C 51/46* (2006.01)
  *B29K 67/00* (2006.01)
  *B29K 511/00* (2006.01)
  *B29L 31/00* (2006.01)

(52) U.S. Cl.
  CPC ............ *B29C 51/426* (2013.01); *B29C 51/46* (2013.01); *B29K 2067/046* (2013.01); *B29K 2511/00* (2013.01); *B29K 2995/0012* (2013.01); *B29K 2995/0039* (2013.01); *B29K 2995/0041* (2013.01); *B29K 2995/0089* (2013.01); *B29L 2031/7132* (2013.01)

(56) References Cited

U.S. PATENT DOCUMENTS

| | | | |
|---|---|---|---|
| 8,110,138 B2 | 2/2012 | Uradnisheck | |
| 8,182,734 B1 | 5/2012 | Uradnisheck | |
| 8,349,955 B2 | 1/2013 | Uradnisheck | |
| 8,936,743 B2 | 1/2015 | Ciou et al. | |
| 8,962,791 B2 | 2/2015 | Benson | |
| 9,045,635 B2 | 6/2015 | Ochiai et al. | |
| 2004/0210031 A1* | 10/2004 | Itoh | B29C 49/0005 528/272 |
| 2008/0258357 A1 | 10/2008 | Bopp et al. | |
| 2009/0053489 A1* | 2/2009 | Yamamura | B32B 27/08 428/483 |
| 2009/0246544 A1* | 10/2009 | Narita | C08J 7/048 525/450 |
| 2009/0311511 A1* | 12/2009 | Obuchi | B29C 51/002 428/323 |
| 2014/0091490 A1 | 4/2014 | Tedford et al. | |
| 2015/0086768 A1 | 3/2015 | Hashimoto et al. | |
| 2017/0260338 A1* | 9/2017 | De Vos | C08J 3/005 |

FOREIGN PATENT DOCUMENTS

| | | | | |
|---|---|---|---|---|
| EP | 2935416 B1 * | 11/2017 | ......... | B29C 47/0021 |
| JP | 2014-051646 A | 3/2014 | | |
| WO | WO-2013131649 A1 * | 9/2013 | ........... | B29C 51/002 |
| WO | 2014/129293 A1 | 8/2014 | | |
| WO | 2014/147132 A1 | 9/2014 | | |
| WO | 2015/048589 A1 | 4/2015 | | |
| WO | 2016/099916 A1 | 6/2016 | | |

OTHER PUBLICATIONS

Mar. 24, 2022 Third Party Observation issued in European Patent Application No. 20700077.9.
"Solubility Study of Ingeo Biopolymer Grades in Common Organic Solvents"; NatureWorks; pp. 1-5.
Feb. 19, 2020 International Search Report issued in International Patent Application No. PCT/EP2020/050324.
Feb. 19, 2020 Written Opinion issued in International Patent Application No. PCT/EP2020/050324.
Jul. 14, 2022 Office Action issued in Japanese Patent Application No. 2021-539107.
Aug. 2, 2022 Office Action issued in Chinese Patent Application No. 202080007869.2.
Lim et al., "Processing Technologies for poly(lactic acid)," Progress in Polymer Science, vol. 33, pp. 820-852, 2008.
ITR Presentation, "Thermoforming," NatureWorks, 16 pages, 2016.

* cited by examiner

THERMOFORMING OF PLA-BASED ARTICLES

The instant invention relates to a method for producing a polylactic acid (PLA) shaped article by thermoforming and to such thermoformed PLA articles.

Biobased polymers are interesting as alternatives to petroleum-derived materials. Biobased polymers can provide an attractive array of end of life options, including recyclability and degradability, and can be obtained from renewable resources. Polylactic acid, also known as polylactide or PLA, has drawn particular attention as a polymer that can be degraded under industrial composting conditions. Further, the raw material for producing polylactic acid (e.g. lactic acid or lactide) can be obtained from fermentation of sugars derived from the agricultural industry.

Polylactic acid has attractive properties, such as high stiffness and the fact that it can be melt-processed into, e.g., fibers, films and injection molded products. However, commonly used polylactic acid articles generally suffer from low heat resistance and low toughness, which reduces its practical application as a general-purpose polymer.

There is a continuous search for PLA articles that show increased heat resistance and strength.

Several methods have been described in the literature for the preparation of PLA articles.

For instance, United States Patent Application No. 2008/0258357 describes a method for producing semicrystalline polylactic acid wherein amorphous sheets of PLA resins are thermoformed by heating the sheets until they become semicrystalline, and then forming the sheets on a relatively cold mold. The semicrystalline thermoformed articles are described to have improved heat resistance. However, the crystallinity of the sheet is too high for thermoformed article to properly retain shape details of the mould.

U.S. Pat. No. 8,110,138 discloses a process comprising extruding a poly(hydroxyalkanoic acid) (PHA) such as polylactic acid (PLA) to produce a first article, which is a partially crystallized film or sheet; thermoforming the first article in a heated mold having a temperature greater than or equal to about 90° C. to produce a second article; and heat treating the second article by holding the second article in the heated mold for less than about 40 seconds to produce a thermoformed article wherein the PHA composition comprises or consist essentially of PHA and 0 to about 4%, based on the weight of the composition, of a nucleator. However, this method requires several molding steps at different temperatures which involves investing into multiple molds, which dramatically increases costs of the process. Further, the resulting thermoformed articles even though may have good properties, they are still unsatisfactory (e.g. in terms of their heat resistance) for the most demanding applications.

US 2009/311511 relates to a lactic acid polymer composition, a molded article comprising the composition, and a process for producing the molded article. More particularly, the document relates to a lactic acid polymer composition which can be imparted with heat resistance by accelerating crystallization with maintaining transparency, a molded article and a sheet comprising the composition, a thermoformed article obtained by secondary-forming the sheet, and a process for producing the thermoformed article.

For completeness, it is noted U.S. Pat. No. 9,045,635 relates to a polylactic acid stereocomplex, a method for production thereof, and a nucleating agent for polylactic acid resin. More specifically, the disclosure relates to a polylactic acid stereocomplex having good heat resistance and a high level of mechanical properties and chemical resistance, a method for efficient production thereof, a nucleating agent containing such a polylactic acid stereocomplex, and a method for producing a polylactic acid resin composition using such a nucleating agent. However, this document does not relate to a method for producing shaped, thermoformed articles.

There is a need for improved methods which result in PLA articles with improved appearance, including good detail retention, heat resistance and strength. In particular, simplified methods which can be run at acceptable speeds by industrial standards, with minimal investments into equipment compared to well-established processes like for polystyrene.

It is an object of the present invention to provide such a method and such PLA articles.

The inventors have now found an improved method for producing such PLA articles which does not suffer from the above indicated problems. In particular, the inventors have now found an improved method for producing a shaped article comprising:
heating a sheet of crystallizable polylactic acid (PLA)-based resin having a ratio of cold crystallization over total melting enthalpy greater than 0.70 as determined by differential scanning calorimetry (DSC), wherein heating comprises a heating step wherein the sheet is heated from a surface temperature of at most 80° C. to a surface temperature of at least 90° C. to at most 150° C. at a heating rate of 5° C. to 25° C. per second, to provide a heated sheet having a ratio of cold crystallization over total melting enthalpy ($\Delta H_{cc}/\Delta H_m$) greater than 0.5 as determined by DSC; and immediately after heating
forming the heated sheet to provide a shaped article by means of a mold, wherein the mold has a temperature of at least 70° C. and at most 120° C.

It has now been found that by heating sheet of crystallizable PLA resin to high temperatures (e.g. 90-150° C., in particular 100-145° C., more in particular 110-140° C., more in particular 110-135° C., and most in particular 115-135° C.) at high speeds (e.g. at a heating rate of 5 to 25° C./s, in particular of 6 to 25° C./s, more in particular of 7 to 20° C./s and yet more in particular of 8 to 15° C./s) a heated sheet is obtained which has low crystallinity prior to thermoforming (a ratio of cold crystallization over total melting enthalpy greater than 0.5, in particular greater than 0.6, more in particular greater than 0.7, and even more in particular greater than 0.75 as determined by DSC).

By obtaining such heated sheets most of the crystallization of the PLA occurs in the mold during the forming step performed immediately after heating, the mold being at a temperature of 70-120° C., in particular greater than 75° C. and at most 120° C., more in particular greater than 80° C. and at most 115° C., and even more in particular greater than 85° C. and at most 110° C. This results in good processing performance and a shaped product with excellent form detail and heat resistance.

BRIEF DESCRIPTION OF THE DRAWINGS

FIG. 1 shows a cup height shrinkage dependency on temperature.

Figure 1A:
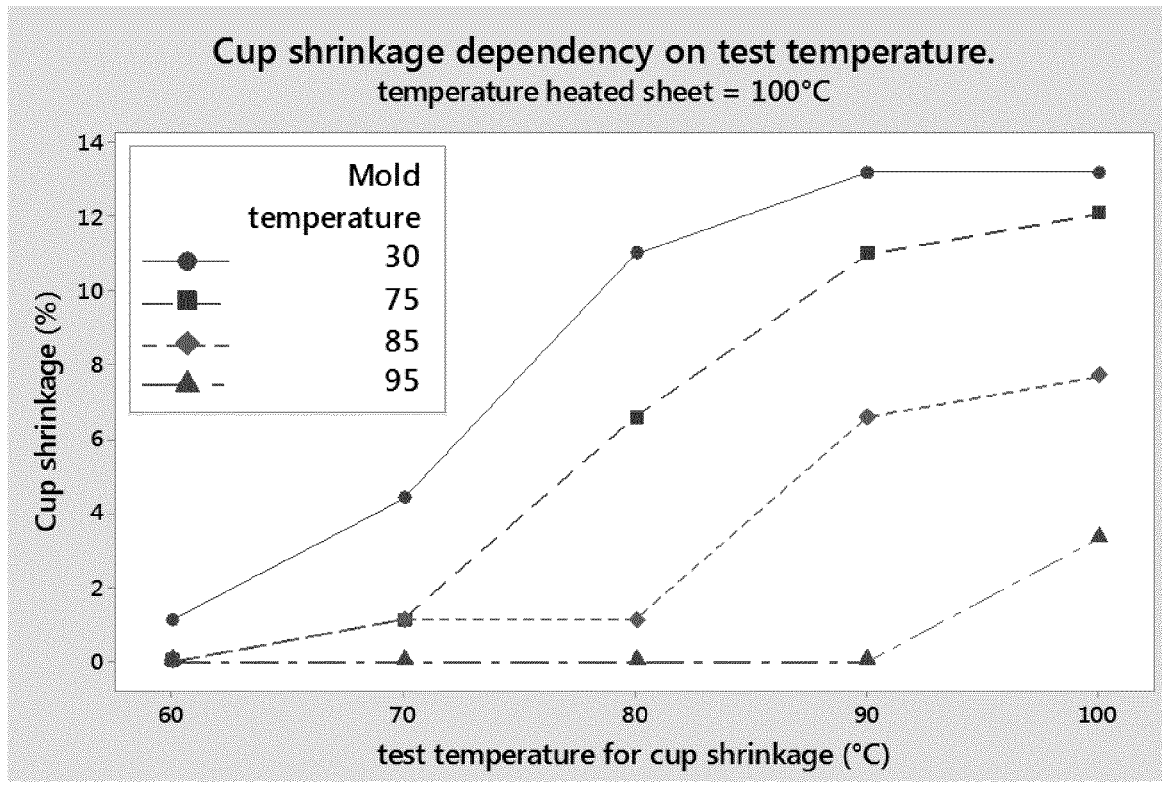
FIG. 1A shows % cup shrinkage of cups thermoformed at various mold temperatures (30, 75, 85 and 95° C. and 100° C. heated sheet temperature obtained by filling cups with 60, 70, 80, 90 and 100° C. water.

The term crystallizable polylactic acid (PLA)-based resin as used herein means a (PLA)-based resin that can be formed into a more crystalline state, e.g. such that when processed according to a method as described may result in a shaped article with an amount of crystals defined by a melting enthalpy ($\Delta H_{m,0}$) of, e.g., greater than 15 J/g, in particular greater than 25 J/gram, more in particular greater than 30 J/gram, yet more in particular greater than 35 J/gram as determined by DSC.

Generally a sheet of crystallizable PLA-based resin as described herein may have a ratio of cold crystallization over total melting enthalpy ($\Delta H_{cc}/\Delta H_m$) greater than 0.70 as determined by DSC. In particular sheets of crystallizable PLA-based resin suitable for a process as described herein may have a ratio of cold crystallization over total melting enthalpy greater than 0.75 in particular greater than 0.80, or even more in particular greater than 0.85 as determined by DSC.

This means that even though it may have some crystallinity it is substantially amorphous. A method as described herein ensures that most of the crystallization of the PLA occurs at a point in time during the process which has been found to be optimal for thermoforming PLA articles with good properties.

A typical melting enthalpy ($\Delta H_{m,0}$) of crystallizable PLA-based resins as described herein may be of less than 12 J/g, in particular less than 9 J/gram, more in particular less than 7 J/gram, and even more in particular less than 5 J/gram as determined by DSC.

The heating as described herein ensures that substantially no crystallization occurs in the heating prior to thermoforming. Accordingly, the heated sheet may have a ratio of cold crystallization over total melting enthalpy ($\Delta H_{cc}/\Delta H_m$) greater than 0.5 in particular greater than 0.6, more in particular greater than 0.7, or even more in particular greater than 0.75 as determined by DSC.

A typical melting enthalpy ($\Delta H_{m,0}$) of heated sheets as described herein may be less than 25 J/gram, in particular less than 20 J/gram, more in particular less than 15 J/gram, yet more in particular less than 10 J/gram, or even more in particular less than 8 J/gram as determined by DSC.

During forming the majority of the crystallization of the PLA resin takes place in the mold. Accordingly the crystallinity of the shaped article is higher than the crystallinity of the heated sheet. Generally, the shaped article may have a ratio of cold crystallization over total melting enthalpy ($\Delta H_{cc}/\Delta H_m$) of less than 0.5, in particular less than 0.4, more in particular less than 0.2, and yet more in particular less than 0.1 as determined by DSC.

A typical melting enthalpy ($\Delta H_{m,0}$) of shaped articles as described herein may be greater than 15 J/gram, in particular greater than 25 J/gram, more in particular greater than 30 J/gram, and yet more in particular greater than 35 J/gram as determined by DSC.

Without being bound by any theory, the crystallinity of the shaped article is believed to contribute to the good properties of the shaped article. In particular, the shaped article is easily thermoformed, has good heat resistance and, leaving the mold, it maintains the designed article specifications, e.g., transferred to it via the mould.

The melting enthalpy ($\Delta H_{m,0}$) and the ratio of cold crystallization over total melting enthalpy ($\Delta H_{cc}/\Delta H_m$) of the PLA-based resin in the sheet before and after being subjected to heating and in the shaped article after forming, can be measured by methods known in the art. In particular, they may be measured by differential scanning calorimetry (DSC) as follows.

A DSC apparatus (e.g. a T.A. Instruments Q2000 DSC Apparatus equipped with a RCS (90) cooler) calibrated with certified Indium, running with a Nitrogen flow of 50 ml/minute may be used. A sample of the PLA-based sheet (taken from the PLA-base sheet prior to or after heating) or a sample of the shaped article of a known weight is placed in a closed pan (e.g. 5.00±2.00 mg of sample is weighted into a Tzero pan from T.A. Instruments and closed with an Tzero Hermetic lid from T.A. Instruments). The closed pan is placed in the oven of the DSC apparatus together with an empty reference pan. The pan with sample is equilibrated at 25° C. for 2 minutes followed by a heating step to 260° C. at a heat rate of 10° C./min. The cold crystallization peak and melting peak are integrated, e.g. using the TA Universal Analysis software, to provide the total melting enthalpy ($\Delta H_m$) and cold crystallization ($\Delta H_{cc}$) of the sample. The total melting enthalpy ($\Delta H_m$) reflects the melting enthalpy of the crystals present in the original sample and the melting enthalpy resulting from the further crystallization of the sample occurring during the DSC measurement.

The ratio of cold crystallization over total melting enthalpy is calculated as follows:

$$\text{Ratio} = \frac{\Delta H_{cc}}{\Delta H_m}$$

$\Delta H_{cc}$: Crystallization enthalpy
$\Delta H_m$: Melting enthalpy

A ratio of 1 corresponds to a fully amorphous polymer while a ratio of 0 corresponds to a polymer crystallized to the maximum possible extent.

The melting enthalpy in the sample ($\Delta H_{m,0}$) is defined as follows:

$$\Delta H_{m,0} = \Delta H_m - \Delta H_{cc}$$

The melting enthalpy $\Delta H_{m,0}$ reflects the melting enthalpy of the crystals present in the original sample.

It is noted that in US 2009/311511 a percentage (%) crystallinity is determined according to the formula: % crystallinity=($\Delta H_m - \Delta H_{cc}$)/93*100. From this formula, it is evident that, in order for a material to have a positive % crystallinity, the melting enthalpy ($\Delta H_m$) must be greater than the enthalpy of cold crystallization ($\Delta H_{cc}$). When the formula gives a negative value for % crystallinity, the material is fully amorphous. A negative value for % crystallinity is theoretically not possible, but may be reported if it originates from variations in the measurement system or data processing.

A crystallizable PLA-based resin suitable for a process described herein may comprise
- from 50 to 100 wt. % of a PLLA (poly L-lactic acid) polymer having an optical purity of at least 95%, based on the weight of L-lactoyl units over the total weight of lactoyl units in the PLLA polymer, preferably of at least 99% and more preferably of at least 99.5%; or
- from 50 to 100 wt. % of a PDLA (poly D-lactic acid) polymer having an optical purity of at least 95% based on the weight of D-lactoyl units over the total weight of lactoyl units in the PDLA polymer, preferably at least 99% and more preferably at least 99.5%.

L-Lactoyl units and D-lactoyl units may be referred to as L-lactic acid monomer units and D-lactic acid monomer units respectively.

The PLLA polymer may preferably have an absolute weight-average molecular weight (Mw) of at least 100.000, more preferably at least 125.000 g/mol and at most 200.000 g/mol. The PDLA polymer may preferably have an absolute weight-average molecular weight (Mw) of at least 75.000, more preferably at least 100.000, most preferably at least 125.000 g/mol and is preferably at most 200.000 g/mol. When either PLLA or PDLA resins are applied at lower values of absolute weight-average molecular weight, mechanical properties such as elongation at break and impact resistance of the shaped PLA articles may become insufficient for certain applications. In contrast, by exceeding the upper limit specified above, the processability of the PLA resin, e.g. during sheet extrusion and thermoforming, may be compromised. More in particular, high pressures and torque levels can be found during sheet extrusion and in the final thermoforming process, crystallization may be slowed down leading to longer cycle times which may be undesired in some applications.

The absolute weight-average molecular weight (Mw) may be determined by methods known in the art such as Gel Permeation Chromatography (GPC). In particular GPC may be preferably performed using hexafluoroisopropanol as a solvent and equipped with a light scattering detector to determine absolute values of molecular weight. More in particular, a Viscotek GPC Mx VE2001 system may be used with hexafluoroisopropanol (also known as 1,1,1,3,3,3-hexafluoro-2-propanol or HFiP) with 0.02 M $CF_3COOK$ as solvent at a flow rate of 0.7 mL/min. Two PFG analytical columns sourced from Polymer Standard Service (PSS) (M, 300×8.00 mm, 7 μm) connected in series may be used as size exclusion columns.

PLLA and PDLA polymers used in PLA resins as described herein may be commercially available. Examples of commercially available PLLA and PDLA polymers include, e.g., Luminy® PLLA L175, Luminy® PLLA L130, Luminy® PDLA D070, Luminy® PDLA D120 (all commercially available from Total CorCorbion PLA BV, The Netherlands).

Alternatively, PLLA and PDLA polymers may be obtained from lactic acid or lactide monomers (e.g. L-lactide monomer and D-lactide monomer, which are cyclic dimers of L and D-lactic acid respectively) by methods known in the art. The polymerization of lactide monomers takes place via a ring-opening polymerization mechanism in, e.g., a melt polymerization. Catalysts suitable for performing ring-opening polymerization of lactide are known in the art. Commercially available lactide monomers which may be used in a process as described herein include L-lactide PURALACT® L and D-lactide PURALACT® D both available from Total Corbion PLA BV, The Netherlands).

A PLA-based resin as described herein may also comprise a nucleation package. If the crystallizable PLA-based resin comprises PLLA polymer, the nucleation package may preferably comprise PDLA as nucleating agent. If the crystallizable PLA-based resin comprises PDLA polymer, the nucleation package may preferably comprise PLLA as nucleating agent. The PLLA or PDLA as nucleating agent may be preferably present in an amount of 0.1-10 wt. % based on the total amount of PLA present in the crystallizable PLA-based resin (including both PLLA and PDLA).

The nucleation package may additionally or alternatively comprise inorganic nucleating agents such as minerals. Such minerals may be selected from talc and/or kaolin. The inorganic nucleating agents may be preferably present in an amount of 0.1-30 wt. %, based on the amount of PLA polymer present in the crystallizable PLA-based resin (including both PLLA and PDLA).

A PLA-based resin as described herein may further comprise other additives, which may be part of the nucleation package or added independently to the PLA-based resin, selected from, e.g., fillers, impact modifiers (e.g. aliphatic polyester and/or core-shell rubbers), lubricants, reinforcing agents, UV-stabilizers, thermal stabilizers, flame retarders, antioxidants and colorants. In a particular embodiment, the PLA-based resin may comprise a filler and/or an impact modifier.

A particularly suitable PLA resin may be a composition as described in WO 2013/131649.

A sheet of crystallizable PLA-based resin as described herein may be obtained by methods known in the art, provided that the processing conditions are such that the PLA-based resin remains crystallizable in the sheet (i.e. the PLA resin is not fully crystallized during the formation of the sheet). For instance, PLLA polymer or PDLA polymer, and any additives such as nucleation packages or other additives as described above, may be melt compounded and formed into a sheet by a sheet extrusion process. In particular, extrusion temperatures may be of at least 170° C. and of at most 220° C. to ensure the melting of PLLA and PDLA polymer and preventing degradation of PLA, which can thermally degrade at temperatures significantly exceeding 240° C. In particular, the extrusion temperature may be from 180 to 210° C. The extruded sheet may be quenched onto a chill roll of which the temperature is set below 50° C., in particular from 20 to 40° C. The PLA-based resin crystallizable sheet obtained may generally have a ratio of cold crystallization over total melting enthalpy ($\Delta H_{cc}/\Delta H_m$) greater than 0.70, in particular greater than, 0.75 more in particular greater than 0.80, or even more in particular greater than 0.85 as described above. Further, a typical melting enthalpy ($\Delta H_{m,0}$) of sheets of crystallizable PLA-based resin as described herein may be of less than 12 J/gram, in particular less than 9 J/gram, more in particular less than 7 J/gram, and even more in particular less than 5 J/gram as determined by DSC as described above.

In a particular example, a sheet of crystallizable PLA-based resin may be suitably obtained by methods described in WO 2013/131649. For instance, the PLA-based resin components (e.g. PLLA polymer, nucleation package and any additional additive of choice) may be mixed and melted under dry conditions before the molten material is shaped into a sheet which solidifies. More in particular, the PLA-based resin components may be mixed in an extruder, wherein the PLA-based resin may be extruded through a flat dye to provide a sheet of crystallizable PLA-based resin.

A sheet of crystallizable PLA-based resin obtained by such extrusion methods may be referred to as extruded sheet.

Sheets of crystallizable PLA-based resin suitable for a method as described herein may be of any thickness required by the final shaped article. As a mode of example the starting sheet may have a thickness of 100 to 1500 μm, in particular of 200 to 800 μm.

A method as described herein comprises heating the sheet of crystallizable PLA-based resin. Heating comprises a heating step wherein the sheet is heated from a surface temperature of at most 80° C. to a surface temperature of at least 90° C. to at most 150° C. Heating may be preferably performed to a surface temperature of 100-145° C., more preferably of 110-140° C., more preferably 110-135° C., and most preferably 115-135° C. At a lower surface temperature the final product may lose its product detail or may not provide the required heat resistance for certain applications, while a higher surface temperature the sheet might lead to excessive sagging.

It is important that heating to said surface temperature is achieved rapidly. Accordingly the heating step is performed at a heating rate of 5-25° C./s, in particular 6 25° C./s, more in particular 7-20° C./s and yet more in particular at a rate of 8-15° C./s. Higher heating rates may lead to a hot sheet surface temperature, while the core of the sheet is still too cold to be formed, which may be detrimental to the part detail or even result in the formation of holes in the sheet during the forming process. Lower heating rates may adversely result in crystallization of the PLA in the heated sheet prior to forming step to an extend which may be detrimental to the forming process and to achieving the required part detail or even result in the formation of holes in the sheet during the forming process.

The surface temperature of the sheet, e.g. at the end of the heating step just before it enters the mold for forming, may be measured by methods available in the art such as using a non-contact infra-red device like a pyrometer, using a contact thermometer or by using thermo-strips. The use of a contact thermometer may be preferred.

Heating the sheet of amorphous crystallizable PLA resin may comprise a preheating step prior to the heating step wherein the sheet is kept at a temperature from at least 30° C. to at most 80° C.

The heating rate and heating time of the preheating step are irrelevant provided that the temperature of the sheet is not raised above 80° C. and the subsequent the heating step is performed at the prescribed temperature and heating rate.

The temperature of the sheet in the preheating and the heating step can be easily estimated by a person skilled in the art from the starting temperature of the sheet, the temperature settings of the oven used for heating and the time of the sheet at said temperature. The temperature of the sheet in the preheating and the heating step may also be measured according the methods described above.

As a skilled person will understand, the time during which the sheet is subjected to heating during the heating step will depend on the specific starting and final temperature of the sheet as well as the specific heating rate. For instance, if the sheet is preheated the heating step will bring the sheet from the preheated temperature of 30-80° C. to a surface temperature of 90-150° C., at a heating rate of 5-25° C. per second, heating times for the heating step will vary from 0.5 to 24 seconds. Similar heating times may be used, even if no pre-heating step is performed, for instance when the starting temperatures of the sheet are in similar temperature ranges than the preheating step. This may be the case, e.g., if the sheet is directly used after forming and cooling (to e.g. 25-75° C.) in a method as described above. On the other hand, if no preheating is performed, the sheet may be brought from room temperature (e.g. 10-25° C.) to a surface temperature of at least 90° C. to at most 150° C. at a heating rate of 5° C. to 25° C. per second, e.g., requiring heating times from 2.6 to 28 seconds. Specific calculations of the required heating times may be easily made by a skilled person for other combinations of surface temperatures and heating rates described herein.

Heating may performed in an oven typically used in the art, e.g. calrod, ceramic, quartz and halogen ovens. An oven of any length may be used provided that heating is performed to the surface temperature and rate described above. In order to do so, heating may have an exponential profile. For instance in long ovens (e.g. longer than 2 meters) heating may comprise a preheating step in which the temperature of the sheet is gradually raised from, e.g., room temperature (e.g. 10-25° C.) to a temperature from 30° C. to at most 80° C. and then the temperature of the sheet is rapidly raised to the required surface temperature (90-150° C.) at the prescribed rate of (5-25° C. per second). This can be easily achieved in long ovens having different heating units which can be independently adjusted at the required temperatures. It is well within the scope of a skilled person to determine the right oven settings. The heating times of the sheet will depend on the length of the oven and the starting and final temperature of the sheet. For instance, a preheating step may require the sheet to be subjected to relatively low temperatures for a relatively long period of time. In contrast, the subsequent heating step will require short heating times at a high temperatures to achieve the prescribed heating rates.

Shorter ovens (e.g. of 0.5-1 m) may also be used. Such shorter ovens may not require a preheating step and the sheet may be brought directly from room temperature (e.g. 10-25° C.) to a surface temperature of at least 90° C. to at most 150° C. at a heating rate of 5° C. to 25° C. per second.

The heated sheet so obtained has a ratio of cold crystallization over total melting enthalpy ($\Delta H_{cc}/\Delta H_m$) greater than 0.5 in particular greater than 0.6, more in particular greater than 0.7, or even more in particular greater than 0.75 as determined by DSC.

Without wishing to be bound by theory, it is important for the heated sheet to have a ratio of cold crystallization over total melting enthalpy ($\Delta H_{cc}/\Delta H_m$) in the specified range. This allows for good formability of the product, while the crystallization of the PLA, required to achieve a heat-stable product, takes place during the forming step.

Further, a typical melting enthalpy ($\Delta H_{m,0}$) of heated sheets as described herein may be less than 25 J/gram, in particular less than 20 J/gram, more in particular less than 15 J/gram, yet more in particular less than 10 J/gram, or even more in particular less than 8 J/gram as determined by DSC. Immediately after heating the heated sheet is formed to provide a shaped article by means of a mold. The type of shaped article to be obtained will determine the mold to be used provided that the mold temperature can be controlled to be of at least 70° C. and at most 120° C. Examples of suitable molds may include, for instance, a cup mold provided with heated means.

Mold temperatures of greater than 75° C. and at most 120° C., in particular greater than 80° C. and at most 115° C., or even greater than 85° C. and at most 110° C. may be preferred. Such mold temperatures advantageously result in shaped articles with improved properties for certain applications, e.g. good product detail, reduced product shrinking and good mold reproducibility.

Shrinking as used herein means the reduction of the dimensions of the shaped article. For instance, when the dimensions of the shaped article become smaller than those corresponding to the mold dimensions, e.g., upon cooling. Such shrinking may occur within the mold or when a shaped article is removed from its mold. Shrinking may also occur when immersing the shaped article in hot water (at a temperature of, e.g., 60-100° C.) for 5 minutes.

For forming, the article may stay in the heated mold for a period of time of 0.5 to 10 seconds, in particular for 0.5 to 4 seconds. Shorter molding times may increase the production speeds but may detrimentally reduce the crystallization of the PLA resin during thermoforming and result in products with worse properties for certain applications. Longer molding times may decrease the production speeds without further improving he properties of the final shaped articles.

In a method as described herein a 1-stage process (also referred to as cut-in-place process) may be advantageously used, in which the article is formed, crystallized and cut in one stage. However, if desired, a 2-stage process may also be used, in which the article is formed and crystallized in the first station and cooled and cut in the second station. If desired in a process as described herein an additional mold may be used. Such an additional mold may have a lower temperature (e.g. of 10-40° C.) than the mold used for thermoforming and the shaped article may be allowed to cool in the additional mold. Cooling may also be performed at room temperature by simply removing the shaped article from the heated mold, without requiring the use of an additional mold, as it is performed in a 1-stage process.

A shaped article of PLA-based resin obtained by a method as described herein (also referred to as thermoformed article) displays improved characteristics such as good heat resistance, minimal or no shrinking, good mechanical properties, and good mold reproducibility. Without being bound to any theory it is believed that the good properties of the shaped article are due not only to the crystallization of PLA taking place in a method as described herein but also to the moment at which crystallization takes place, e.g. during thermoforming.

A shaped article as described herein, has a ratio of cold crystallization over total melting enthalpy ($\Delta H_{cc}/\Delta H_m$) of less than 0.5, in particular less than 0.4, more in particular less than 0.2, and yet more in particular less than 0.1 as determined by DSC. Further, a typical melting enthalpy ($\Delta H_{m,0}$) of shaped articles as described herein may be greater than 15 J/gram, in particular greater than 25 J/gram, more in particular greater than 30 J/gram, and yet more in particular greater than 35 J/gram as determined by DSC.

A shaped article as described herein may generally be thermo-resistant, i.e. has low deformability and shrinkage when subjected to high temperatures. Shrinkage may be measured by immersing the shaped article, or a sample thereof, in water at a temperature from 60 to 100° C. for 5 minutes, and comparing the dimensions of the shaped article, or sample thereof, prior to and after immersing. In particular, shaped article as described herein or a sample thereof may display a shrinking of less than 2% when immersed in hot water, i.e. water at a temperature from 60 to 100° C. for, e.g., 5 minutes.

Shrinkage of shaped articles such as cups may also be measured by filling the shaped article with water with at a temperature of 60-100° C. and compare the height before and after filling. The change of cup dimensions may be calculated by the formula;

$$\text{Shrinkage (\%)} = \frac{\text{Cup height after hot fill (mm)}}{\text{Original cup height (mm)}} * 100\%$$

Shaped articles as described herein are suitable for a wide range of applications given their improved properties. In particular, they can be used in applications wherein PLA has been known to have limited applicability. For instance, shaped articles as described herein may be suitably used as food containers such as cups, bowls, trays, plates, boxes, which have to withstand temperatures around the boiling point of water, e.g. coffee cups and food trays such as microwavable boxes.

The present invention is further illustrated by the following Examples, without being limited thereto or thereby.

EXAMPLES

Example 1

Example 1 shows the forming behavior of a 60 mm wide and 60 mm deep cup based on different PLA and nucleated PLA formulations, heated with different heat rates.

The materials tested are listed in table 1

Preparation PLA Formulations (Melt Compounding)

Samples 2-5 were prepared by melt compounding PLLA (Luminy® PLLA L175 from Total Corbion PLA) with an absolute weight average molecular weight between 110-130 kg/mol together with the additives described in Table 1. Prior compounding the PLLA and PDLA were dried for a minimum of 4 hours at 85° C. in a desiccant hot air dryer with a dew point lower than −40° C.

The compounding was performed on a Brabender 25 mm co-rotating twin screw extruder having a temperature profile of 170/180/190/200/200/200/200/200/200/190° C., hopper to die. The resulting strand was cooled down in a water bath and granulated.

Preparation of Extruded PLA Sheet

Commercial PLLA (Luminy® PLLA L175 from Total Corbion PLA) with an absolute weight average molecular weight between 110-130 kg/mol (sample 1) and samples 2-5 compounded as described above, were transformed into a 0.5 mm sheet on a Battenfeld single screw extruder having a temperature profile of 95/205/195/195/195/195° C., hopper to final zone. Prior sheet extrusion, the PLA formulations of samples 1-5 were dried for a minimum of 4 hours at 85° C. in a desiccant hot air dryer with a dew point lower than −40° C. The die temperature was set at 190-200° C. and the extruded sheet was cooled down on horizontal chill rolls operating at 25° C.

TABLE 1

PLA formulations and DSC properties ($\Delta H_{m,0}$ and $\Delta H_{cc}/\Delta H_m$) of the resulting crystallizable PLA sheets

| | PLA formula- | DSC properties extruded sheet | | | |
|---|---|---|---|---|---|
| Sample | tion* (wt. %) | $\Delta H_{cc}$ | $\Delta H_m$ | $\Delta H_{m,0}$ | $\Delta H_{cc}/\Delta H_m$ |
| 1 | PLLA (100) | 49.7 | 55.6 | 5.9 | 0.89 |
| 2 | PLLA (95) + PDLA (5) | 49.5 | 51.9 | 2.4 | 0.95 |
| 3 | PLLA (94) + PDLA (5) + talc (1) | 48.4 | 52.0 | 3.6 | 0.93 |
| 4 | PLLA (84) + talc (1) + kaolin (15) | 40.9 | 51.0 | 10.1 | 0.80 |
| 5 | PLLA (79) + PDLA (5) + talc (1) + kaolin (15) | 34.1 | 42.2 | 8.1 | 0.81 |

*In all formulations PLLA was Luminy® PLLA L175 and PDLA was Luminy® PDLA D070

The ratio of cold crystallization enthalpy over the melting enthalpy ($\Delta H_{cc}/\Delta H_m$) in the extruded PLA sheet was measured by DSC using a T.A. Instruments Q2000 DSC Apparatus equipped with a RCS (90) cooler, calibrated with certified Indium, running with a Nitrogen flow of 50 ml/minute.

A sample of the PLA-based sheet of 5.00±2.00 mg was weighted into a Tzero pan from T.A. Instruments and closed with an Tzero Hermetic lid from T.A, Instruments. The closed pan was placed in the oven of the DSC apparatus together with an empty reference pan. The pan with sample was equilibrated at 25° C. for 2 minutes followed by a heating step to 260° C. at a heat rate of 10° C./min.

The cold crystallization peak and melting peak were integrated using the TA Universal Analysis software, and the ratio of cold crystallization over total melting enthalpy ($\Delta H_{cc}/\Delta H_m$) and the melting enthalpy of the original sample ($\Delta H_{m,0}$) were calculated as described above.

The results for each extruded sheet are listed in Table 1.

Thermoforming Cups

For each of the extruded PLA sheets (samples 1-5) thermoforming (including both the heating and forming steps of a method as described herein) was performed on a 1989 Kiefel KD20/25 thermoformer. The thermoformer was equipped with 12 individually controllable top bottom ceramic heating elements, plug assist and a female mold of which the temperature was controlled by a water based temperature control unit operating to a maximum of 95° C.

The extruded PLA sheet was clamped in a frame and transferred to the heating station of the thermoformer. The sheet was heated from room temperature (25° C.) at different heat rates. The temperature of the sheet was measured immediately after leaving the heating station with a Testo 635-1 contact thermometer. The heating rates and the surface temperature of the heated sheets are listed in Table 2 and Table 4.

The heated sheet was either:
1. Thermoformed into a cup with a top diameter of 60 mm and height of 60 mm. In order to do so, the heated sheet was brought into the forming station in which the sheet was formed by pre-stretching the sheet by a plug, plug assisted thermoforming, followed by applying positive pressure of 5.5 bar forcing the sheet to shape into the mold. The mold temperature was set to 25° C. The thermoformed article was kept in the mold for 6 seconds before releasing manually.
2. Quenched immediately in cold water to be able to determine the ratio of cold crystallization enthalpy over the melting enthalpy of the heated PLA sheet.

The following analysis were performed:

Differential Scanning calorimetry (DSC) measurement as detailed above for the PLA extruded sheet was performed on a sample of the heated sheet to obtain the melting enthalpy ($\Delta H_{m,0}$) and the ratio of cold crystallization enthalpy over the total melting enthalpy ($\Delta H_{cc}/\Delta H_m$) thereof (Table 2). The different PLA extruded sheets (samples 1-5) were heated from room temperature to the temperature indicated in Table 2 using different profiles as detailed.

Visual rating of the thermoformed product. The thermoformed products obtained were rated according the rating listed in Table 3 the results are listed in Table 4, which shows the parameters of the thermoforming process and the resulting formability of the cups (rated according Table 3) for PLA extruded sheets of different formulations (samples 1-5 above).

The areas in grey in Tables 2 and 4 indicate materials which did not form well, independent of the cause.

TABLE 2

DSC properties of sheets of different PLA formulations heated using different heating profiles

| | | Heated sheet | | | | | | | | | | | | | | |
|---|---|---|---|---|---|---|---|---|---|---|---|---|---|---|---|---|
| | | Sample 1 | | | Sample 2 | | | Sample 3 | | | Sample 4 | | | Sample 5 | | |
| $T_{heated\ sheet}$ (° C.) | heat rate (° C./s) | $\Delta H_{cc}$ | $\Delta H_{m,0}$ | $\Delta H_{cc}/\Delta H_m$* | $\Delta H_{cc}$ | $\Delta H_{m,0}$ | $\Delta H_{cc}/\Delta H_m$* | $\Delta H_{cc}$ | $\Delta H_{m,0}$ | $\Delta H_{cc}/\Delta H_m$* | $\Delta H_{cc}$ | $\Delta H_{m,0}$ | $\Delta H_{cc}/\Delta H_m$* | $\Delta H_{cc}$ | $\Delta H_{m,0}$ | $\Delta H_{cc}/\Delta H_m$* |
| 68 | 4.1 | 40.3 | 4.5 | 0.90 | 39.3 | 2.0 | 0.95 | 38.0 | 3.6 | 0.91 | 30.9 | 10.7 | 0.74 | 30.7 | 10.9 | 0.74 |
| 84 | 2.9 | 37.0 | 8.0 | 0.82 | 38.3 | 4.6 | 0.89 | 26.7 | 15.4 | 0.63 | 12.4 | 27.2 | 0.31 | 0 | 35.3 | 0.00 |
| 99 | 2.1 | 36.6 | 8.8 | 0.81 | 33.5 | 8.6 | 0.80 | 10.1 | 31.2 | 0.24 | 5.7 | 37 | 0.13 | 0 | 41.4 | 0.00 |
| 115 | 1.5 | 37.6 | 6.4 | 0.85 | 29.4 | 13.3 | 0.69 | 7.6 | 37.5 | 0.17 | 3.0 | 43.1 | 0.07 | 0 | 42.2 | 0.00 |
| 68 | 8.3 | 41.6 | 4.6 | 0.90 | 40.2 | 0.4 | 0.99 | 39.3 | 2.5 | 0.94 | 32.2 | 10.3 | 0.76 | 33.4 | 8.6 | 0.80 |
| 84 | 6.3 | 40.1 | 6.4 | 0.86 | 37.5 | 4.2 | 0.90 | 35.2 | 6.3 | 0.85 | 20.0 | 20.6 | 0.49 | 17.3 | 22.2 | 0.44 |
| 99 | 5.1 | 41.0 | 4.7 | 0.90 | 36.6 | 6.1 | 0.86 | 28.5 | 16.1 | 0.64 | 12.0 | 30.1 | 0.29 | 6.6 | 34.7 | 0.16 |
| 115 | 4.3 | 38.5 | 8.1 | 0.83 | 34.3 | 7.1 | 0.83 | 27 | 15.7 | 0.63 | 11.1 | 34 | 0.25 | 7.5 | 37.5 | 0.17 |
| 146 | 4.1 | 43.0 | 4 | 0.91 | 35.1 | 8.7 | 0.80 | 32.2 | 9.7 | 0.77 | 32.1 | 9 | 0.78 | 22.2 | 19.4 | 0.53 |
| 68 | 16.5 | 39.4 | 4.9 | 0.89 | 41.9 | −0.6 | 1.01 | — | — | — | 32.0 | 10.1 | 0.76 | 34.2 | 7.1 | 0.83 |
| 84 | 13.7 | 38.9 | 5.5 | 0.88 | 41.8 | 0 | 1.00 | 36.2 | 5.5 | 0.87 | 27.6 | 15.3 | 0.64 | 29.3 | 12.3 | 0.70 |
| 99 | 10.8 | 39.1 | 7.8 | 0.83 | 39.5 | 2.9 | 0.93 | 33.3 | 11.2 | 0.75 | 17.0 | 25.9 | 0.40 | 12.6 | 28 | 0.31 |
| 115 | 9.4 | 38.5 | 8.8 | 0.81 | 38.3 | 4.8 | 0.89 | 39.6 | 12.5 | 0.76 | 21.5 | 20.1 | 0.52 | 19.5 | 23.6 | 0.45 |
| 146 | 9.0 | 38.9 | 9.3 | 0.81 | 38.6 | 4.2 | 0.90 | 35.1 | 5.6 | 0.86 | 30.9 | 11.2 | 0.73 | 31.7 | 10.7 | 0.75 |

*Calculated from $\Delta H_{cc}$ and $\Delta H_m$ (which is derived from the values of the table as follows: $\Delta H_m = \Delta H_{cc} + \Delta H_{m,0}$)

TABLE 3

Visual rating of thermoformed cups

| Formability rating | Description |
|---|---|
| 1 | The shaped article formed well, had excellent part detail and was easily removed from the mold |
| 2 | The shaped article formed well, sheet filled the mold the way to the bottom, but the part details were not sharp. |
| 3 | Shaped article contained stress whitening (due to the forming step being too cold). |
| 4 | The shaped article did not form well, sheet did not reach the bottom of the mold, holes were present in the sheet. |

TABLE 4 formability of PLA sheets of different composition (materials 1-5) using different heat profiles

| | heating | Thermoformed material | | | | |
|---|---|---|---|---|---|---|
| $T_{heated\ sheet}$ (° C.) | rate (° C./s) | 1 | 2 | 3 | 4 | 5 |
| | | formability, 60 mm cup | | | | |
| 68 | 4.1 | 3 | 3 | 3 | 2 | 4 |
| 84 | 2.9 | 2 | 2 | 2 | 2 | 4 |
| 99 | 2.1 | 1 | 1 | 2 | 4 | 4 |

TABLE 4-continued formability of PLA sheets of different composition
(materials 1-5) using different heat profiles

| | heating | Thermoformed material | | | | |
|---|---|---|---|---|---|---|
| $T_{heated\ sheet}$ (° C.) | rate (° C./s) | 1 | 2 | 3 | 4 | 5 |
| | | formability, 60 mm cup | | | | |
| 115 | 1.5 | 1 | 1 | 4 | 4 | 4 |
| 68 | 8.3 | 3 | 3 | 4 | 2 | 4 |
| 84 | 6.3 | 2 | 2 | 2 | 2 | 2 |
| 99 | 5.1 | 1 | 1 | 2 | 2 | 4 |
| 115 | 4.3 | 1 | 1 | 2 | 2 | 4 |
| 146 | 4.1 | 1 | 1 | 1 | 1 | 1 |
| 68 | 16.5 | 4 | 4 | 4 | 4 | 4 |
| 84 | 13.7 | 2 | 3 | 2 | 2 | 2 |
| 99 | 10.8 | 1 | 1 | 2 | 2 | 2 |
| 115 | 9.4 | 1 | 1 | 1 | 1 | 2 |
| 146 | 9.0 | 1 | 1 | 1 | 1 | 1 |

It was found that for a good formability (e.g. a rating of 1) a combination of conditions were fulfilled. In particular:
1. The minimum temperature of the heated sheet was higher than 84° C., e.g. at least 90° C.
2. The addition of nucleating agents and fillers (as in samples 3-5) reduced the forming window (i.e. range of temperatures of the heated sheet resulting in good forming properties).
3. The ratio of cold crystallization enthalpy and melting enthalpy of the heated sheet was above 0.5.

It is noted all samples formed well when the temperature was near the melting point of the PLA sheets (regardless of the heating rate used to heat the sheet prior to thermoforming). However, when the PLA sheets are heated to a temperature near the melting point of PLA, they become very soft. This makes it difficult to (also) achieve a good material distribution in the product.

Example 2

Example 2 shows the thermoforming process of an extruded PLA sheet based on the formulation of sample 5 (as listed in Table 1).
Preparation of PLA-Based Resin Crystallizable Sheet (Sheet Extrusion)
Sheet extrusion was performed on a 100 mm single screw extruder with a screen pack, melt pump and flat die. the extruded sheet was cooled down on horizontal chill rolls operating at 25° C. and wound onto a core. The resulting sheet had a width of 450 mm and a thickness of 0.69 mm.

The melting enthalpy and the ratio of cold crystallization enthalpy over total melting enthalpy ($\Delta H_{cc}/\Delta H_m$) of the extruded sheet (before heating) was measured with DSC and is listed in Table 6.
Thermoforming
The resulting sheet was thermoformed on a Gabler M98 thermoforming machine with a single cavity prototype tool into cups of a diameter of 70.6 mm and a height of 90.6 mm.

The PLA roll stock was unwind and pre-heated with a roll heater up to 40° C. After the pre-heating station the sheet was transferred into the 3.6 meter long oven.

The temperature profiles used in this set of experiments are listed in Table 5.

After leaving the oven the sheet was formed and cut in place in an electrically heated mold using plug assist and positive pressure. The DSC properties of the heated sheet were not measured as the forming process was automated and was not possible to obtain a sample of the heated sheet after exiting the oven and prior to entering the heated mould.

The mold temperature was varied and can be found in Table 5.

Thermoformed cups were immediately visually checked for form detail and thickness distribution. The shrinkage was tested by filling the thermoformed cup immediately with water of 60, 70, 80, 90 and 100° C., obtained by a variable temperature kettle. The shrinkage of the thermoformed cup was calculated using the following equation:

$$\text{Cup shrinkage (\%)} = \frac{\text{Cup height after hot fill (mm)}}{\text{Original cup height (mm)}} * 100\%$$

The results of the forming detail upon visual inspection and the shrinkage of the thermoformed products (cups) are shown in Table 7.

TABLE 5

Thermoforming conditions

| Sample | $T_{heated\ sheet}$ (° C.) | Heating rate (° C./s) | $T_{mold}$ (° C.) |
|---|---|---|---|
| 5-A | 85 | 1.3 | 80 |
| 5-B | 95 | 1.5 | 80 |
| 5-C | 100 | 1.6 | 80 |
| 5-D | 105 | 1.7 | 80 |
| 5-E | 93 | 3.6 | 60 |
| 5-F | 100 | 7.1 | 95 |
| 5-G | 100 | 7.1 | 85 |
| 5-H | 100 | 7.1 | 75 |
| 5-I | 100 | 7.1 | 30 |
| 5-J | 130 | 11.3 | 75 |
| 5-K | 130 | 11.3 | 85 |
| 5-L | 140 | 9.0 | 85 |
| 5-M | 120 | 14.6 | 85 |

TABLE 6

DSC properties

| | Extruded sheet | | | Cup Bottom | | | Cup wall | | |
|---|---|---|---|---|---|---|---|---|---|
| Sample | $\Delta H_{cc}$ | $\Delta H_{m,0}$ | $\Delta H_{cc}/\Delta H_m$* | $\Delta H_{cc}$ | $\Delta H_{m,0}$ | $\Delta H_{cc}/\Delta H_m$* | $\Delta H_{cc}$ | $\Delta H_{m,0}$ | $\Delta H_{cc}/\Delta H_m$ |
| 5-A | 29.8 | 0.7 | 0.98 | | | | 31.4 | 0.5 | 0.99 |
| 5-B | 29.8 | 0.7 | 0.98 | | | | 20.6 | 12.3 | 0.62 |
| 5-C | 29.8 | 0.7 | 0.98 | | | | 19.9 | 12.3 | 0.62 |
| 5-D | 29.8 | 0.7 | 0.98 | | | | 14.5 | 15.7 | 0.48 |
| 5-E | 34.0 | 5.3 | 0.86 | 1 | 38.1 | 0.02 | 1.2 | 35.4 | 0.03 |
| 5-F | 34.0 | 5.3 | 0.86 | 2.2 | 34.1 | 0.06 | | | |
| 5-G | 34.0 | 5.3 | 0.86 | 4.9 | 29 | 0.14 | 9.7 | 27.6 | 0.26 |
| 5-H | 34.0 | 5.3 | 0.86 | 9.9 | 31.2 | 0.24 | 8.9 | 28.5 | 0.24 |
| 5-I | 34.0 | 5.3 | 0.86 | | | | | | |
| 5-J | 34.0 | 5.3 | 0.86 | | | | | | |
| 5-K | 34.0 | 5.3 | 0.86 | | | | | | |
| 5-L | 34.0 | 5.3 | 0.86 | | | | | | |
| 5-M | 34.0 | 5.3 | 0.86 | 1.2 | 31.8 | 0.04 | 2.4 | 34.7 | 0.07 |

*Calculated from $\Delta H_{cc}$ and $\Delta H_m$ (which is derived from the values of the table as follows: $\Delta H_m = \Delta H_{cc} + \Delta H_{m,0}$)

TABLE 7 form detail and heat resistance of thermoformed products

| Sample | form detail* | Cup height shrinkage (mm) at varying temperatures | | | | |
|---|---|---|---|---|---|---|
| | | 60° C. | 70° C. | 80° C. | 90° C. | 100° C. |
| 5-A | nok | | | | | |
| 5-B | nok | | | | | |
| 5-C | nok | | | | | |
| 5-D | nok | | | | | |
| 5-E | nok | | | | | |
| 5-F | ok | 0 | 0 | 0 | 0 | 3 |
| 5-G | ok | 0 | 1 | 1 | 6 | 7 |
| 5-H | ok | 0 | 1 | 6 | 10 | 11 |
| 5-I | ok | 1 | 4 | 10 | 12 | 12 |
| 5-J | ok | 0 | 0.2 | 1.5 | 2.5 | 3 |
| 5-K | ok | 0 | 0 | 0.5 | 1 | 1.5 |
| 5-L | nok | 0 | 0 | 0 | 0.5 | 1 |
| 5-M | ok | 0 | 0 | 0 | 0 | 0 |

*ok: good form detail; nok: form detail which is not good

Figure 1B:
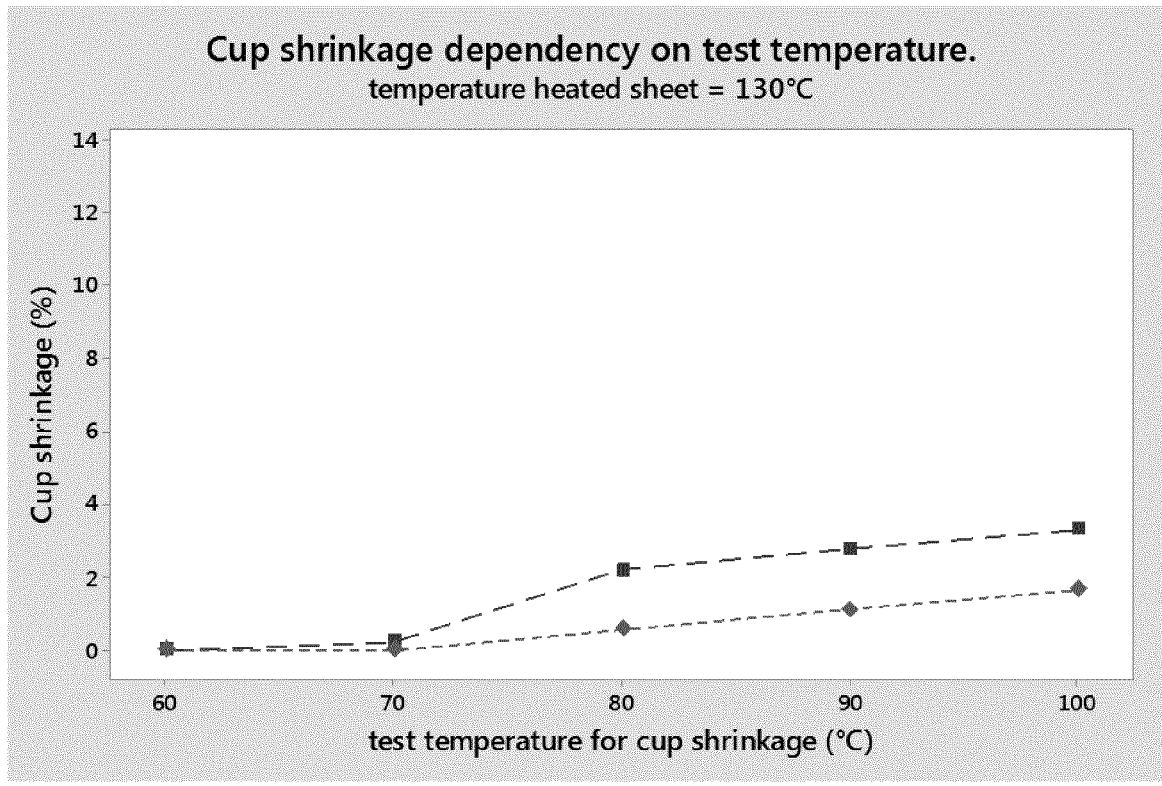
FIG. 1B shows % cup shrinkage of cups thermoformed at 75 and 85° C. and 130° C. heated sheet temperature obtained by filling cups with 60, 70, 80, 90 and 100° C. water.

Samples 5-A to 5-F could not be formed into a well-formed product and, therefore, no cup height shrinkage could be measured. The shrinkage results are graphically presented in FIG. 1 for samples 5-F to 5-K, obtained with varying mold temperatures (30, 75, 85 or 95° C.) and varying heated sheet temperatures (100° C. for FIG. 1A and 130° C. for FIG. 1B). With regard to sample 5-L, it is noted the heated sheet was very soft before the forming process took place, resulting in an undesirable wall thickness distribution. The resulting product (cup) was, therefore, not good enough for commercial purposes. In all other aspects, the form detail of the product (cup) was "ok".

It was found that cups with good product detail and/or a heat stability greater than 90° C. were obtained when:
1. The a heat rate was greater than 4° C./s, e.g. at least 5° C./s. Best results were achieved with heat rates of at least 7° C./s, or even at least 9° C./s.
2. The mold temperature was greater than 60° C., e.g. at least 70° C. Best results were achieved with a temperature greater than 80° C.
3. The PLA sheet was heated to a surface temperature greater than 85° C., e.g. of at least 90° C. Best results were achieved with mold temperatures greater than 100° C.

The invention claimed is:

1. A method for producing a shaped article, comprising:
-heating a sheet of crystallizable polylactic acid (PLA)-based resin having a ratio of cold crystallization over total melting enthalpy ($\Delta Hcc/\Delta Hm$) greater than 0.7 as determined by differential scanning calorimetry (DSC), wherein the heating comprises a preheating step prior to a heating step, wherein
in the preheating step, the sheet is subjected to heating to a temperature from at least 40° C. to at most 80° C.,
in the heating step, the sheet is heated from a surface temperature of at most 80° C. to a surface temperature of at least 90° C. to at most 150° C. at a heating rate of 5° C. to 25° C. per second,
wherein in the preheating step, the heating is at a heating rate different from the heating rate of the heating step and/or the sheet is kept at the temperature of the preheating for a period of time prior to commencement of the heating step, to provide a heated sheet having a ratio of cold crystallization over total melting enthalpy ($\Delta Hcc/\Delta Hm$) greater than 0.6 as determined by DSC; and, immediately after the heating of the sheet, forming the heated sheet to provide a shaped article by means of a mold, wherein the mold has a temperature of at least 70° C. and at most 120° C.

2. The method according to claim 1, wherein the crystallizable PLA-based resin comprises
from 50 to 100 wt. % of a poly L-lactic acid (PLLA) polymer having an optical purity of at least 95%, based on the weight of L-lactoyl units over the total weight of lactoyl units in the PLLA polymer; or
from 50 to 100 wt. % of a poly D-lactic acid (PDLA) polymer having an optical purity of at least 95% based on the weight of D-lactoyl units over the total weight of lactoyl units in the PDLA polymer.

3. The method according to claim 1, wherein in the heating step the sheet is heated to a surface temperature of at least 100° C. to at most 145° C.

4. The method according to claim 3, wherein in the heating step, the sheet is heated to a surface temperature of at least 100° C. to at most 135° C.

5. The method according to claim 1, wherein in the heating step the heating rate is of 6 to 25° C./s.

6. The method according to claim 5, wherein in the heating step, the heating rate is from 7 to 20° C./s.

7. The method according to claim 6, wherein in the heating step, the heating rate is from 8 to 15° C./s.

8. The method according to claim 1, wherein the heated sheet has a ratio of cold crystallization over total melting enthalpy ($\Delta Hcc/\Delta Hm$) greater than 0.7 as determined by DSC.

9. The method according to claim 1, wherein the heated sheet has a melting enthalpy ($\Delta Hm,0$) of less than 25 J/gram as determined by DSC.

10. The method according to claim 1, wherein the crystallizable PLA-based resin comprises a nucleation package and wherein
if the crystallizable PLA-based resin comprises PLLA polymer, the nucleation package comprises PDLA as nucleating agent; or
if the crystallizable PLA-based resin comprises PDLA polymer, the nucleation package comprises PLLA as nucleating agent,
the PLLA or PDLA as nucleating agent being present in an amount of 0.1-10 wt. % based on the total amount of PLA present in the crystallizable PLA-based resin.

11. The method according to claim 1, wherein the crystallizable PLA-based resin comprises a nucleation package comprising at least one mineral as a nucleating agent and present in an amount of 0.1-30 wt. % based on the amount of PLA present in the crystallizable PLA-based resin.

12. The method according to claim 11, wherein the at least one mineral is selected from among talc and kaolin.

13. The method according to claim 1, wherein the PLA-based resin comprises a filler and/or an impact modifier.

14. The method according to claim 1, wherein the mold has a temperature of greater than 75° C. and at most 120° C.

15. The method according to claim 1, wherein the shaped article has a ratio of cold crystallization over total melting enthalpy ($\Delta Hcc/\Delta Hm$) of less than 0.5 as determined by DSC and has a melting enthalpy ($\Delta Hm,0$) greater than 15 J/gram as determined by DSC.

16. The method according to claim 1, wherein the shaped article is thermo-resistant and displays a shrinking of less than 2% when immersed in water at a temperature from 60 to 100° C. for 5 minutes.

17. The method according to claim 1, wherein the heated sheet has a ratio of cold crystallization over total melting enthalpy (ΔHcc/ΔHm) greater than 0.75 as determined by DSC.

18. The method according to claim 1, wherein the mold has a temperature of from 70° C. to less than 95° C.

19. A method for producing a shaped article, comprising:
heating a sheet of crystallizable polylactic acid (PLA)-based resin having a ratio of cold crystallization over total melting enthalpy (ΔHcc/ΔHm) greater than 0.7 as determined by differential scanning calorimetry (DSC), wherein the heating comprises a preheating step prior to a heating step, wherein
in the preheating step, the sheet is subjected to heating to a temperature from at least 40° C. to at most 80° C. and
in the heating step, the sheet is heated from a surface temperature of at most 80° C. to a surface temperature of at least 90° C. to at most 150° C. at a heating rate of 5° C. to 25° C. per second,
to provide a heated sheet having a ratio of cold crystallization over total melting enthalpy (ΔHcc/ΔHm) greater than 0.6 as determined by DSC; and, immediately after the heating,
forming the heated sheet to provide a shaped article by means of a mold, wherein the mold has a temperature of from 70° C. to 85° C.

20. A method for producing a shaped article, comprising:
-heating a sheet of crystallizable polylactic acid (PLA)-based resin having a ratio of cold crystallization over total melting enthalpy (ΔHcc/ΔHm) greater than 0.7 as determined by differential scanning calorimetry (DSC), wherein the heating comprises a preheating step prior to a heating step, wherein
in the preheating step, the sheet is subjected to heating to a temperature from at least 40° C. to at most 80° C.,
in the heating step, the sheet is heated from a surface temperature of at most 80° C. to a surface temperature of at least 115° C. to at most 150° C. at a heating rate of 5° C. to 25° C. per second, to provide a heated sheet having a ratio of cold crystallization over total melting enthalpy (ΔHcc/ΔHm) greater than 0.6 as determined by DSC; and, immediately after the heating,
forming the heated sheet to provide a shaped article by means of a mold, wherein the mold has a temperature of at least 70° C. and at most 120° C.

* * * * *